Patented May 22, 1945

2,376,333

UNITED STATES PATENT OFFICE 2,376,333

METHOD OF PRESERVING MICROORGANISMS

Peter A. Ark, Berkeley, Calif., assignor to The Regents of The University of California, Berkeley, Calif., a corporation of California No Drawing. Application February 3, 1941, Serial No. 377,204

13 Claims. (Cl. 195—73)

This invention relates to a method and product for preserving and applying legume nodule bacteria and other micro-organisms used in industry and medicine.

Certain chemical materials, such as lipids or lipid-like materials, change from a liquid to a solid state, and vice versa, at temperatures compatible with the survival of different varieties of micro-organisms. For instance, the legume nodule bacteria (Rhizobium species) are killed or destroyed at a temperature of 60° C. or higher. Now if a medium could be maintained in a liquid state at a temperature of approximately 55° C. or below and, upon a rapid fall of temperature, change into a solid or jelly-like state, the bacteria could be embedded in a medium during the liquid state and preserved by cooling and hardening of the substance.

Furthermore, if this solid or jelly-like medium with the bacteria embedded therein could be again changed to a liquid at 55° C., the organisms would survive and be in suspension, and could thus be sprayed or applied to seed, or otherwise utilized. Such a method would provide a very convenient means for preserving and handling legume nodule bacteria (Rhizobium species), the acidophilus bacteria (*Lactobacillus acidolphilus*), therapeutic and industrial yeasts (Saccharomyces species), and numerous other useful micro-organisms.

Glycol stearate is one of the best chemicals in which to incorporate legume nodule bacteria and other micro-organisms, since its melting point is below the thermal death point of the legume nodule bacteria. Other substances that can be substituted for glycol stearate are fats and fat-like substances such as glycerol monostearate, Prostearin, propylene glycol stearate, Trigamine Stearate, and all stearate combinations giving solid or jelly-like compounds easily dispersible in water. Also water-miscible preparations of oleic or palmitic acid, such as glycol oleate or potassium palmitate, may be used.

The stearates, the oleic and palmitic acid materials mentioned come under the general class of "lipids." A definition of "lipid," as found in both Gardner's and Bodansky's texts on biochemistry, reads as follows:

"Recently the term 'lipids' or 'lipides' has found a certain amount of usage as a general group name for the fats and fat-like substances."

"Lipids—Substances having the following characteristics: a) Insolubility in water and solubility in the fat solvents such as ether, chloroform, benzene; b) Relationship to the fatty acids and esters, either actual or potential."

The micro-organisms to be incorporated in glycol stearate or similar materials should be grown in a laboratory on media best adapted for their growth. The glycol stearate, or other substance to be employed, is then melted and kept at a temperature of approximately 55° C. The micro-organisms are then removed from their growth media and warmed to a temperature of 55° C. and rapidly mixed with the melted glycol stearate. This mixing should be done under aseptic conditions. The mixture of melted stearate and micro-organisms may now be poured into proper sterilized molds or suitable containers for storage, shipment, or otherwise.

Another method of preservation consists in preparing a paste of about 5% glycol stearate with water or other suitable substance, mixing into it the desired micro-organisms, and then pumping out or otherwise removing the water, for instance by a vacuum pump, until a solid or jelly-like state is reached. This method is applicable to micro-organisms with a lower thermal death point.

A solid mixture of micro-organisms in diglycol stearate, when cut into fine pieces and dropped into lukewarm water and shaken or agitated well for a short time, will rapidly make a fine colloidal suspension. The legume nodule bacteria prepared in this way may be applied to seeds by spraying or dipping; this treatment leaves a thin solid film on the seed, which is not readily removed. However, when the seed is planted and germinates, the film swells and the micro-organisms are released to infect the roots of the plants.

This process is equally applicable to the preservation of yeasts commonly employed for therapeutic purposes. In such cases the yeast cells are embedded in the diglycol stearate matrix in very much the same way as in the case of the nitrogen-fixing bacteria (Rhizobium species).

The same is true of the Acidophilus bacillus, which in this case would have an advantage over the current practice in that it would be more palatable, easier to take, and more safely sent out to distant points. In this case glycerol monostearate (edible) can be conveniently used.

The dairy industry can also utilize this method to embed cream-souring bacteria (starters) and thus have them in a more convenient and fresher condition than is obtained by the methods used at present. In this case diglycol stearate does not have to be in an absolutely solid state, but can be used in jelly-like form.

While certain features of my invention have been more or less specifically described, I wish it understood that changes in arrangement and use may be resorted to.

Having thus described my invention, what I claim and desire to secure by Letters Patent is:

1. A method of preserving micro-organisms which consists in providing a water-miscible oleic acid ester which changes from a solid to a liquid state at a temperature compatible with the survival of the micro-organisms, incorporating the micro-organisms in the substance while in the liquid state, and then cooling and solidifying the substance to enclose and preserve the micro-organisms.

2. A method of preserving micro-organisms which consists in providing a water-miscible palmitic acid ester which changes from a solid to a liquid state at a temperature compatible with the survival of the micro-organisms, incorporating the micro-organisms in the substance while in the liquid state, and then cooling and solidifying the substance to enclose and preserve the micro-organisms.

3. A method of preserving micro-organisms which consists in providing a water-miscible stearate which changes from a solid to a liquid state at a temperature compatible with the survival of the micro-organisms, heating said stearate to convert the same to a liquid state, incorporating the micro-organisms in the substance while in the liquid state, and then cooling and solidifying the substance to enclose and preserve the micro-organisms.

4. A method of preserving micro-organisms which consists in heating glycol stearate to substantially 55° C. to change it from a solid to a liquid state, incorporating micro-organisms in the glycol stearate while in the liquid state, and then cooling and solidifying the glycol stearate to enclose and preserve the micro-organisms.

5. The method of treating micro-organisms which are killed at a temperature as low as about 60° C., comprising heating the solid ester reaction product of a polyhydric alcohol and a fatty acid of the $C_nH_{2n+1}COOH$ series where $n$ varies between 16 and 18 to liquefy said solid reaction product, the latter melting at a temperature compatible with the survival of said organisms upon incorporation therein, incorporating said organisms in said liquid, cooling said liquid to a solid matrix enclosing and preserving said organisms, and releasing said live organisms from the enveloping matrix.

6. The method of treating micro-organisms which are killed at a temperature as low as about 60° C., comprising heating the solid glycol ester of a fatty acid of the $C_nH_{2n+1}COOH$ series where $n$ varies between 16 and 18 to liquefy said solid glycol ester, the latter melting at a temperature compatible with the survival of said organisms upon incorporation therein, incorporating said organisms in said liquid, cooling said liquid to a solid matrix enclosing and preserving said organisms, and releasing said live organisms from the enveloping matrix.

7. The method of treating micro-organisms which are killed at a temperature as low as about 60° C., comprising heating solid glycol stearate to liquefy the same, said stearate melting at a temperature compatible with the survival of said organisms upon incorporation therein, incorporating said organisms in said liquid, cooling said liquid to a solid matrix enclosing and preserving said organisms, and releasing said live organisms from the enveloping matrix.

8. The method of treating micro-organisms which are killed at a temperature as low as about 60° C., comprising heating solid glycol oleate to liquefy the same, said oleate melting at a temperature compatible with the survival of said organisms upon incorporation therein, incorporating said organisms in said liquid, cooling said liquid to a solid matrix enclosing and preserving said organisms, and releasing said live organisms from the enveloping matrix.

9. The method of treating micro-organisms which are killed at a temperature as low as about 60° C., comprising forming a paste of the ester reaction product of a polyhydric alcohol and a fatty acid of the $C_nH_{2n+1}COOH$ series, where $n$ varies between 16 and 18, said paste being formed at a temperature compatible with the survival of said organisms upon incorporation therein, incorporating said organisms in said paste, dehydrating the paste to a firm jell matrix enclosing and preserving said organisms, and releasing said live organisms from the enveloping matrix.

10. The method of treating micro-organisms which are killed at a temperature as low as about 60° C., comprising forming a paste of a glycol ester of a fatty acid of the $C_nH_{2n+1}COOH$ series, where $n$ varies between 16 and 18, said paste being formed at a temperature compatible with the survival of said organisms upon incorporation therein, incorporating said organisms in said paste, dehydrating the paste to a firm jell matrix enclosing and preserving said organisms, and releasing said live organisms from the enveloping matrix.

11. The method of treating micro-organisms which are killed at a temperature as low as 60° C., comprising forming a 5% paste of a glycol ester of a fatty acid of the $C_nH_{2n+1}COOH$ series where $n$ varies between 16 and 18, said paste being formed at a temperature compatible with the survival of said organisms upon incorporation therein, incorporating said organisms in said paste, dehydrating the paste to a firm jell matrix enclosing and preserving said organisms, and releasing said live organisms from the enveloping matrix.

12. The method of treating micro-organisms which are killed at a temperature as low as about 60° C., comprising forming a paste of a 5% glycol stearate, said paste being formed at a temperature compatible with the survival of said organisms, and containing a liquid component, dehydrating the paste to a firm jell matrix, enclosing and preserving said organisms, and releasing said live organisms from the enveloping matrix.

13. The method of treating micro-organisms which are killed at a temperature as low as about 60° C., comprising forming a paste of a 5% glycol stearate, said paste being formed at a temperature compatible with the survival of said organisms and containing an aqueous component, dehydrating the paste to a firm jell matrix, enclosing and preserving said organisms, and releasing said live organisms from the enveloping matrix.

PETER A. ARK.